US012742924B2

(12) United States Patent
Shimizu et al.

(10) Patent No.: US 12,742,924 B2
(45) Date of Patent: Sep. 22, 2026

(54) PLASTIC OPTICAL FIBER, HYBRID CABLE, PATCH CORD, AND ACTIVE OPTICAL CABLE

(71) Applicant: NITTO DENKO CORPORATION, Osaka (JP)

(72) Inventors: Takashi Shimizu, Osaka (JP); Hiroshi Ohmura, Osaka (JP); Takeshi Saito, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 445 days.

(21) Appl. No.: 18/553,090

(22) PCT Filed: Mar. 29, 2022

(86) PCT No.: PCT/JP2022/015739
§ 371 (c)(1),
(2) Date: Sep. 28, 2023

(87) PCT Pub. No.: WO2022/210810
PCT Pub. Date: Oct. 6, 2022

(65) Prior Publication Data

US 2024/0210615 A1 Jun. 27, 2024

(30) Foreign Application Priority Data

Mar. 29, 2021 (JP) ................................ 2021-056221

(51) Int. Cl.
*G02B 6/00* (2006.01)
*B29D 11/00* (2006.01)
(Continued)

(52) U.S. Cl.
CPC .... *G02B 6/02033* (2013.01); *B29D 11/00663* (2013.01); *G02B 6/44528* (2023.05)

(58) Field of Classification Search
CPC ............ G02B 6/02033; G02B 6/44528; G02B 6/02038; G02B 6/4416; G02B 6/00; B29D 11/00663; C08F 124/00; C09D 137/00
See application file for complete search history.

(56) References Cited

U.S. PATENT DOCUMENTS 7,787,732 B2 * 8/2010 Sugizaki .............. G02B 6/4436 385/127
10,539,746 B2 * 1/2020 Nakanishi .......... G02B 6/03616
(Continued)

FOREIGN PATENT DOCUMENTS

CN 101203786 A 6/2008
CN 110461599 A 11/2019
(Continued)

OTHER PUBLICATIONS

Office Action, issued by the Japanese Patent Office on Nov. 4, 2025, in connection with Japanese Patent Application No. 2023-511444.
(Continued)

*Primary Examiner* — Jennifer Doan
(74) *Attorney, Agent, or Firm* — Edwards Neils LLC; Jean C. Edwards, Esq.

(57) ABSTRACT

A plastic optical fiber includes a core and a clad disposed on an outer circumference of the core. The core includes a first resin, and the clad includes a second resin. The first resin has a first glass transition temperature $Tg_1$ of 120° C. or higher. The second resin has a second glass transition temperature $Tg_2$ of 120° C. or higher. When the plastic optical fiber bent once 180 degrees at 25° C. has a curvature radius R and a minimum of the curvature radius R is defined as a curvature radius at which a crack does not occur in a bent portion of the plastic optical fiber, the minimum is 5 mm or less.

13 Claims, 4 Drawing Sheets

(51) Int. Cl.

| | |
|---|---|
| ***G02B 6/02*** | (2006.01) |
| ***G02B 6/44*** | (2006.01) |

(56) References Cited

U.S. PATENT DOCUMENTS

| | | | |
|---|---|---|---|
| 2009/0067794 | A1 | 3/2009 | Aoyagi et al. |
| 2015/0177456 | A1 | 6/2015 | Tanaka et al. |
| 2018/0224617 | A1 | 8/2018 | Lee et al. |
| 2020/0384746 | A1 | 12/2020 | Taguwa et al. |
| 2022/0236478 | A1 | 7/2022 | Okada et al. |
| 2022/0267490 | A1 | 8/2022 | Kawamitsu et al. |

FOREIGN PATENT DOCUMENTS

| | | | | |
|---|---|---|---|---|
| JP | 2002-071972 | A | 3/2002 | |
| JP | 2006-276412 | A | 10/2006 | |
| JP | 2007-504125 | A | 3/2007 | |
| JP | 2020-071432 | A | 5/2020 | |
| JP | 2020187207 | A | * 11/2020 | ............ G02B 1/045 |
| JP | 2021-024900 | A | 2/2021 | |
| JP | 2021-036312 | A | 3/2021 | |
| WO | 2005/021526 | A2 | 3/2005 | |
| WO | 2014/042023 | A1 | 3/2014 | |
| WO | 2020/230599 | A1 | 11/2020 | |

OTHER PUBLICATIONS

Office Action, issued by the Taiwanese Intellectual Property Office on Jul. 7, 2025, in connection with Taiwanese Patent Application No. 111112058.

International Search Report issued in PCT/JP2022/015739 on Jun. 21, 2022.

Written Opinion issued in PCT/JP2022/015739 on Jun. 21, 2022.

Office Action, issued by the Japanese Patent Office on Apr. 21, 2026, in connection with Japanese Patent Application No. 2023-511444.

Office Action, issued by the State Intellectual Property Office of People's Republic of China on Apr. 9, 2026, in connection with Chinese Patent Application No. 202280025320.5.

* cited by examiner

PLASTIC OPTICAL FIBER, HYBRID CABLE, PATCH CORD, AND ACTIVE OPTICAL CABLE

CROSS-REFERENCE TO RELATED APPLICATIONS

The present application is a 35 U.S.C. 371 National Stage Entry of PCT/JP2022/015739, filed on Mar. 29, 2022, which claims priority from Japanese Patent Application No. 2021-056221, filed on Mar. 29, 2021, the contents of all of which are herein incorporated by reference in their entirety.

TECHNICAL FIELD

The present invention relates to a plastic optical fiber, a hybrid cable, a patch cord, and an active optical cable.

BACKGROUND ART

Plastic optical fibers include a core, which is a light transmitting portion, located in a central portion and a clad covering an outer circumference of the core. The core is made of a resin material having a high refractive index. The clad is made of a resin material having a lower refractive index than that of the resin material of the core so that light will stay within the core.

Plastic optical fibers are often required to have high heat resistance. Various configurations of plastic optical fibers have been proposed for improvement of their heat resistances. For example, Patent Literature 1 discloses, as a plastic optical fiber excellent in heat resistance, a plastic optical fiber including: an inner layer corresponding to a core and including a noncrystalline fluorine-containing polymer (a) substantially free of a C—H bond; and an outer layer corresponding to a clad and including a fluorine-containing polymer (c) having a lower refractive index than the refractive index of the fluorine-containing polymer (a), the fluorine-containing polymer (c) having an affinity for the fluorine-containing polymer (a).

CITATION LIST

Patent Literature

Patent Literature 1: JP 2002-071972 A

SUMMARY OF INVENTION

Technical Problem

Recently, both heat resistance and flexibility are required of plastic optical fibers. However, plastic optical fibers may have decreased flexibilities if the materials of cores and clads thereof are selected in view of improvement in heat resistance only.

Therefore, the present invention aims to provide a plastic optical fiber ensuring a favorable flexibility and having an improved heat resistance. Furthermore, the present invention also aims to provide a hybrid cable, a patch cord, and an active optical cable including the above plastic optical fiber having both flexibility and heat resistance.

Solution to Problem

A first aspect of the present invention provides a plastic optical fiber including:

- a core; and
- a clad disposed on an outer circumference of the core, wherein
- the core includes a first resin,
- the clad includes a second resin,
- the first resin has a first glass transition temperature $Tg_1$ of 120° C. or higher,
- the second resin has a second glass transition temperature $Tg_2$ of 120° C. or higher, and
- when the plastic optical fiber bent once 180 degrees at 25° C. has a curvature radius R and a minimum of the curvature radius R is defined as a curvature radius at which a crack does not occur in a bent portion of the plastic optical fiber, the minimum is 5 mm or less.

A second aspect of the present invention provides a plastic optical fiber including:

- a core; and
- a clad disposed on an outer circumference of the core, wherein
- the core includes a first resin,
- the clad includes a second resin,
- the first resin has a first glass transition temperature $Tg_1$ of 120° C. or higher,
- the second resin has a second glass transition temperature $Tg_2$ of 120° C. or higher, and
- a fiber structure composed of the core and the clad has a birefringence of $2.0\times10^{-4}$ or more.

A third aspect of the present invention provides a hybrid cable including the plastic optical fiber according to the above first aspect.

A fourth aspect of the present invention provides a patch cord including:

- a cable including the plastic optical fiber according to the above first aspect; and
- a connector attached to at least one end portion of the cable.

A fifth aspect of the present invention provides an active optical cable including:

- a cable including the plastic optical fiber according to the above first aspect;
- a first connector attached to a first end portion of the cable and including a first converter that converts an electrical signal into an optical signal; and
- a second connector attached to a second end portion of the cable and including a second converter that converts an optical signal into an electrical signal.

Advantageous Effects of Invention

According to the present invention, a plastic optical fiber ensuring a favorable flexibility and having an improved heat resistance can be provided. Furthermore, according to the present invention, a hybrid cable, a patch cord, and an active optical cable including a plastic optical fiber having both flexibility and heat resistance can be provided.

DESCRIPTION OF EMBODIMENTS

An embodiment of a plastic optical fiber (hereinafter referred to as "POF") of the present invention will be described. The POF of the present embodiment includes a core and a clad disposed on an outer circumference of the core. The POF of the present embodiment is, for example, a graded-index (GI) POF.

Figure 1:
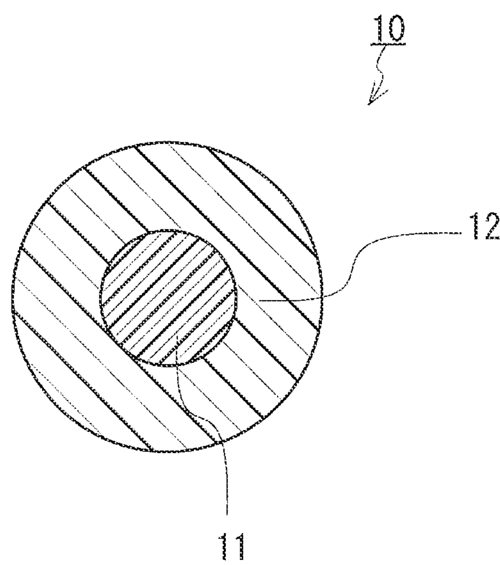
FIG. 1 is a schematic diagram showing an example of a cross-sectional structure of a plastic optical fiber according to an embodiment of the present invention.

FIG. 1 shows an example of a cross-sectional structure of the POF of the present embodiment.

A POF 10 as shown in FIG. 1 includes a core 11 and a clad 12 disposed on an outer circumference of the core 11.

In the POF 10 of the present embodiment, the core 11 includes a first resin. The first resin has a glass transition temperature (first glass transition temperature $Tg_1$) of 120° C. or higher. Moreover, the clad 12 includes a second resin. The second resin has a glass transition temperature (second glass transition temperature $Tg_2$) of 120° C. or higher. When the POF 10 bent once 180 degrees at 25° C. has a curvature radius R and a minimum of the curvature radius R is defined as a curvature radius at which a crack does not occur in a bent portion of the POF 10, the minimum is 5 mm or less. The minimum, at which a crack does not occur in a bent portion, of the curvature radius R is hereinafter referred to as "minimum curvature radius". The minimum curvature radius is preferably less than 5 mm.

The term "glass transition temperature" herein refers to a midpoint glass transition temperature ($T_{mg}$) determined according to JIS K 7121: 1987.

Since having the above configuration, the POF 10 of the present embodiment can ensure a favorable flexibility and have an improved heat resistance. That is, the POF 10 of the present embodiment can ensure a flexibility in a practical range and have an improved heat resistance. Specifically, since both the first glass transition temperature $Tg_1$ of the first resin included in the core 11 and the second glass transition temperature $Tg_2$ of the second resin included in the clad 12 are 120° C. or higher, the POF 10 of the present embodiment can have an improved heat resistance. For example, even when exposed to a high temperature around 105° C., the POF 10 of the present embodiment can reduce the resulting dimensional variation. To further improve the heat resistance, the first glass transition temperature $Tg_1$ and the second glass transition temperature $Tg_2$ are preferably 125° C. or higher, more preferably 130° C. or higher. Furthermore, the POF 10 of the present embodiment has such an excellent flexibility that the above-described minimum curvature radius, namely, the curvature radius at which a crack occurs by 180-degree bending, can be as small as 5 mm or less. Therefore, while ensuring a flexibility required of a POF, the POF 10 of the present embodiment can be used in applications where the POF 10 is required to have heat resistance.

The method for determining the above-described minimum curvature radius of the POF 10 of the present embodiment includes, for example: bending the POF 10 once 180 degrees at a certain curvature radius R; unbending the POF 10; and then observing a bent portion in the POF 10 using a microscope to confirm whether there is a crack. Such a 180-degree bending test is performed at different curvature radii R, once for each curvature radius R. The minimum curvature radius at which a crack does not occur can be determined using the results of the 180-degree bending test at a plurality of curvature radii R. For example, the 180-degree bending test is performed at curvature radii R of 10 mm, 5 mm, 2.5 mm, 2 mm, and 1 mm. For example, in the case where no cracks occur in a POF in the 180-degree bending test at curvature radii R of 10 mm, 5 mm, and 2.5 mm and a crack occurs in the POF in the 180-degree bending test at a curvature radius R of 2 mm, the minimum curvature radius of the POF can be regarded as less than 2.5 mm. It should be noted that 180-degree bending of the POF 10 can be performed, for example, by preparing a test tool with a groove having a certain curvature radius R and putting the POF 10 in the groove to bend the POF 10. This 180-degree bending test may be performed, as described above, several times at different curvature radii R to determine the minimum curvature radius. To confirm whether the minimum curvature radius is less than 5 mm, the 180-degree bending test may be performed at a curvature radius R of 5 mm; if it is confirmed that no crack occurs in the bent portion of the POF 10, the minimum curvature radius thereof may be regarded as less than 5 mm.

In the 180-degree bending, the curvature radius R refers to an inner radius of the POF 10 (namely, the curvature radius measured along an inner side of the POF 10).

Commonly, resins having high glass transition temperatures can have improved heat resistances, but it is sometimes difficult for such resins to achieve excellent flexibilities at the same time. In the POF 10 of the present embodiment, both the first resin included in the core 11 and the second resin included in the clad 12 have as high a glass transition temperature as 120° C. or higher and achieve such an excellent flexibility that the minimum curvature radius is 5 mm or less. Such an excellent flexibility can be achieved, for example, by making the first resin and the second resin highly oriented in the core 11 and the clad 12. In the present embodiment, the degree of orientation of the first resin in the core 11 and that of the second resin in the clad 12 can be expressed by birefringence. For example, a fiber structure composed of the core 11 and the clad 12 has a birefringence of preferably $2.0\times10^{-4}$ or more, more preferably $2.5\times10^{-4}$ or more, even more preferably $2.7\times10^{-4}$ or more, even more preferably $3.0\times10^{-4}$ or more, even more preferably $4.0\times10^{-4}$ or more, even more preferably $5.0\times10^{-4}$ or more, and even more preferably $6.0\times10^{-4}$ or more. In the case of the POF 10 having a configuration as shown in FIG. 1, the fiber structure composed of the core 11 and the clad 12 refers to the POF 10. In the case of the POF 10 further including another layer (for example, a reinforcing layer 21 described later) on an outer circumference of the clad 12, a portion composed of the core 11 and the clad 12 excluding the additional layer is the fiber structure. Since the fiber structure has a birefringence of $2.0\times10^{-4}$ or more, molecular chains of the first resin and the second resin are highly aligned in the fiber axis direction to improve the flexibility of the fiber structure. Therefore, the POF 10 of the present embodiment can have an excellent flexibility.

As described above, since the fiber structure has a birefringence of $2.0\times10^{-4}$ or more, the molecular chains of the first resin and the second resin are highly aligned in the fiber axis direction to improve the flexibility of the fiber structure and that of the POF 10. Therefore, in another aspect, the POF 10 of the present embodiment may have the following configuration.

The POF 10 includes: the core 11; and the clad 12 disposed on the outer circumference of the core 11, the core 11 includes the first resin, the clad 12 includes the second resin, the first resin has a first glass transition temperature $Tg_1$ of 120° C. or higher, the second resin has a second glass transition temperature $Tg_2$ of 120° C. or higher, and the fiber structure composed of the core 11 and the clad 12 has a birefringence of $2.0\times10^{-4}$ or more.

In the POF 10 having the above configuration, the molecular chains of the first resin and the second resin are highly aligned in the fiber axis direction; therefore, the POF 10 can achieve such an excellent flexibility that, for example, a curvature radius at which a crack occurs by 180-degree bending can be 5 mm or less. That is, the POF 10 having the above configuration also can ensure a favorable flexibility and have an improved heat resistance. In the above case, the birefringence of the fiber structure is preferably $2.5\times10^{-4}$ or more, more preferably $2.7\times10^{-4}$ or more, even more preferably $3.0\times10^{-4}$ or more, even more preferably $4.0\times10^{-4}$ or more, even more preferably $5.0\times10^{-4}$ or more, and even more preferably $6.0\times10^{-4}$ or more.

In order to ensure a more favorable flexibility of the POF 10, a value determined by dividing the degree of orientation, i.e., a value of the birefringence of the fiber structure composed of the core 11 and the clad 12 by the outer radius (unit: m) of the clad (degree of orientation÷(outer radius (unit: m) of clad)=(birefringence of core+clad)÷(outer radius (unit: m) of clad)) is preferably 4.0 or more, more preferably 6.0 or more, and even more preferably 8.0 or more.

At least one selected from the group consisting of the above first resin and the above second resin may be a fluorine-containing resin. Both the first resin and the second resin are preferably fluorine-containing resins. Fluorine-containing resins can achieve a low transmission loss in a wide wavelength region. Therefore, a fluorine-containing resin can be suitably used as a resin included in the core 11 and the clad 12.

Hereinafter, each configuration of the POF 10 of the present embodiment will be described in more details.

(Core 11)

The core 11 is a portion configured to transmit light. The core 11 has a higher refractive index than that of the clad 12. Because of this configuration, light incident on the core 11 is trapped inside the core 11 by the clad 12 and propagates in the POF 10.

The core 11 may include the first resin as its main component. Here, saying that the core 11 includes the first resin as its main component means that the first resin is a component whose content is highest in the core 11 on a mass basis. The first resin content in the core 11 may be 80 mass % or more, 90 mass % or more, or 95 mass % or more.

The core 11 may further include an additive in addition to the first resin. The additive is, for example, a refractive index modifier. That is, the core 11 may be made of a resin composition including the first resin and the additive such as the refractive index modifier. The refractive index modifier can be, for example, a known refractive index modifier used as the material of a core of a POF. The material of the core 11 may include an additive other than the refractive index modifier.

The glass transition temperature of the material of the core 11, namely the material included in the core 11, is preferably 105° C. or higher. Here, in the case where the core 11 further includes the additive such as the refractive index modifier in addition to the first resin, the material of the core 11 refers to a resin composition composed of the first resin and the additive. For example, in the case of the core 11 made of the first resin and the refractive index modifier, a mixture (resin composition) of the first resin and the refractive index modifier preferably has a glass transition temperature of 105° C. or higher.

In the case where the POF 10 of the present embodiment is, for example, a GI POF, the core 11 has a refractive-index distribution in which the refractive index varies in a diameter direction. Such a refractive-index distribution can be formed, for example, by adding the refractive index modifier to the first resin and dispersing the refractive index modifier in the first resin (for example, by thermal diffusion).

The first resin included in the core 11 is not limited to a particular resin as long as the first resin has a high transparency. Examples of the first resin include fluorine-containing resins, acrylic resins such as methyl methacrylate, styrene resins, and carbonate resins. Among these, a fluorine-containing resin is preferably used because, in that case, a low transmission loss can be achieved in a wide wavelength region.

The first resin of the core 11 is preferably a fluorine-containing resin including a fluorine-containing polymer. Hereinafter, the fluorine-containing resin included in the core 11 is referred to as a first fluorine-containing resin, and the fluorine-containing polymer included in the first fluorine-containing resin is referred to as a first fluorine-containing polymer.

It is preferred from the viewpoint of reducing light absorption attributable to stretching energy of a C—H bond that the first fluorine-containing polymer included in the first fluorine-containing resin be substantially free of a hydrogen atom, and it is particularly preferred that every hydrogen atom bonded to a carbon atom be substituted by a fluorine atom. That is, it is preferred that the first fluorine-containing polymer be substantially free of a hydrogen atom and be fully fluorinated. Herein, saying that the fluorine-containing polymer is substantially free of a hydrogen atom means that the hydrogen atom content in the fluorine-containing polymer is 1 mol % or less.

The first fluorine-containing polymer preferably has a fluorine-containing aliphatic ring structure. The fluorine-containing aliphatic ring structure may be included in a main chain of the fluorine-containing polymer, or may be included in a side chain of the first fluorine-containing polymer. The first fluorine-containing polymer has, for example, a structural unit (A) represented by the following formula (1).

(1)

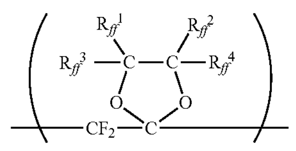

In the formula (1), $R_{ff}^1$ to $R_{ff}^4$ each independently represent a fluorine atom, a perfluoroalkyl group having 1 to 7 carbon atoms, or a perfluoroalkyl ether group having 1 to 7 carbon atoms. $R_{ff}^1$ and $R_{ff}^2$ are optionally linked to form a ring. “Perfluoro” indicates that every hydrogen atom bonded to a carbon atom is substituted by a fluorine atom. In the formula (1), the number of carbon atoms in the perfluoroalkyl group is preferably 1 to 5, more preferably 1 to 3, and even more preferably 1. The perfluoroalkyl group may be linear or branched. Examples of the perfluoroalkyl group include a trifluoromethyl group, a pentafluoroethyl group, and a heptafluoropropyl group.

In the formula (1), the number of carbon atoms in the perfluoroalkyl ether group is preferably 1 to 5 and more preferably 1 to 3. The perfluoroalkyl ether group may be linear or branched. Examples of the perfluoroalkyl ether group include a perfluoromethoxymethyl group.

In the case where $R_{ff}^1$ and $R_{ff}^2$ are linked to form a ring, the ring may be a five-membered ring or a six-membered ring. Examples of the ring include a perfluorotetrahydrofuran ring, a perfluorocyclopentane ring, and a perfluorocyclohexane ring.

Specific examples of the structural unit (A) include structural units represented by the following formulae (A1) to (A8).

(A1)

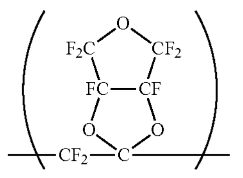

(A2)

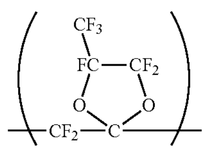

(A3)

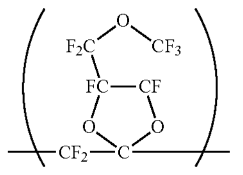

(A4)

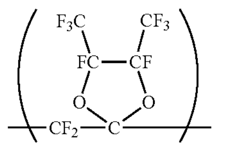

(A5)

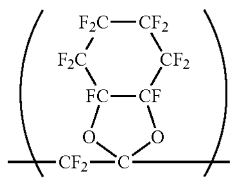

-continued (A6)

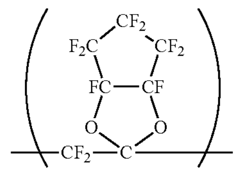

(A7)

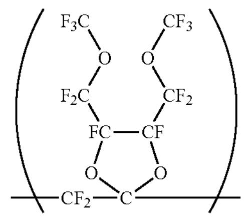

(A8)

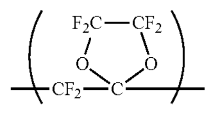

Among the structural units represented by the above formulae (A1) to (A8), the structural unit (A) is preferably the structural unit (A2), i.e., a structural unit represented by the following formula (5).

(5)

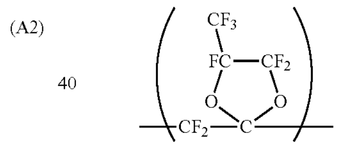

The first fluorine-containing polymer may include one or more structural units (A). In the first fluorine-containing polymer, the amount of the structural unit (A) is preferably 20 mol % or more and more preferably 40 mol % or more of a total amount of all structural units. When including 20 mol % or more of the structural unit (A), the first fluorine-containing polymer tends to have much higher thermal resistance. When including 40 mol % or more of the structural unit (A), the first fluorine-containing polymer tends to have much higher transparency and much higher mechanical strength in addition to high thermal resistance. In the first fluorine-containing polymer, the amount of the structural unit (A) is preferably 95 mol % or less and more preferably 70 mol % or less of the total amount of all structural units.

The structural unit (A) is derived from, for example, a compound represented by the following formula (6). In the formula (6), $R_{ff}^1$ to $R_{ff}^4$ are as described in the formula (1). It should be noted that the compound represented by the formula (6) can be obtained, for example, by an already-known manufacturing method such as a manufacturing method disclosed in JP 2007-504125 A.

(6)

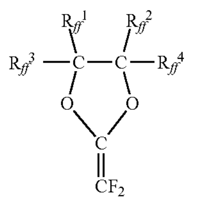

Specific examples of the compound represented by the above formula (6) include compounds represented by the following formulae (M1) to (M8).

(M1)

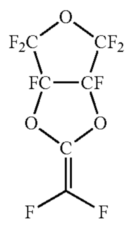

(M2)

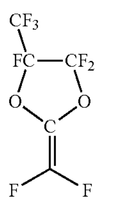

(M3)

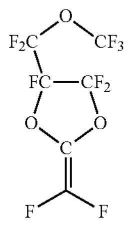

(M4)

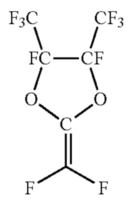

(M5)

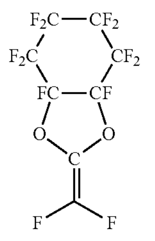

-continued (M6)

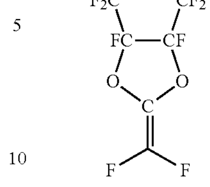

(M7)

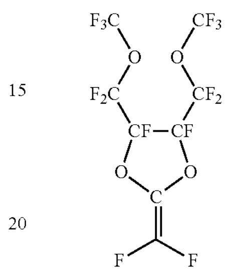

(M8)

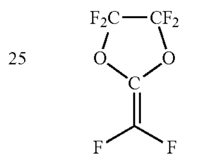

The fluorine-containing polymer may further include an additional structural unit other than the structural unit (A). Examples of the additional structural unit include the following structural units (B) to (D).

The structural unit (B) is represented by the following formula (2).

(2)

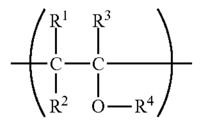

In the formula (2), $R^1$ to $R^3$ each independently represent a fluorine atom or a perfluoroalkyl group having 1 to 7 carbon atoms. $R^4$ represents a perfluoroalkyl group having 1 to 7 carbon atoms. The perfluoroalkyl group is optionally a ring structure. One or some of the fluorine atoms are each optionally substituted by a halogen atom other than a fluorine atom. One or some of fluorine atoms in the perfluoroalkyl group are each optionally substituted by a halogen atom other than a fluorine atom.

The fluorine-containing polymer may include one or more structural units (B). In the fluorine-containing polymer, the amount of the structural unit (B) is preferably 5 to 10 mol % of the total amount of all structural units. The amount of the structural unit (B) may be 9 mol % or less or 8 mol % or less.

The structural unit (B) is derived from, for example, a compound represented by the following formula (7). In the formula (7), $R^1$ to $R^4$ are as described for the formula (2). The compound represented by the formula (7) is a fluorine-containing vinyl ether such as perfluorovinyl ether.

(7)

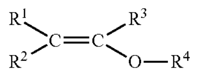

The structural unit (C) is represented by the following formula (3).

(3)

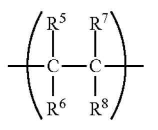

In the formula (3), $R^5$ to $R^8$ each independently represent a fluorine atom or a perfluoroalkyl group having 1 to 7 carbon atoms. The perfluoroalkyl group may have a ring structure. One or some of the fluorine atoms are each optionally substituted by a halogen atom other than a fluorine atom. One or some of fluorine atoms in the perfluoroalkyl group are each optionally substituted by a halogen atom other than a fluorine atom.

The fluorine-containing polymer may include one or more structural units (C). In the fluorine-containing polymer, the amount of the structural unit (C) is preferably 5 to 10 mol % of the total amount of all structural units. The amount of the structural unit (C) may be 9 mol % or less or 8 mol % or less.

The structural unit (C) is derived from, for example, a compound represented by the following formula (8). In the formula (8), $R^5$ to $R^8$ are as described for the formula (3). The compound represented by the formula (8) is a fluorine-containing olefin such as tetrafluoroethylene or chlorotrifluoroethylene.

(8)

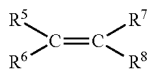

The structural unit (D) is represented by the following formula (4).

(4)

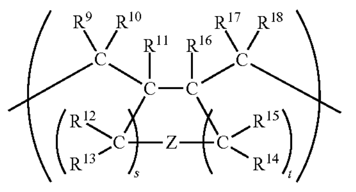

In the formula (4), Z represents an oxygen atom, a single bond, or —OC($R^{19}R^{20}$)O—, $R^9$ to $R^{20}$ each independently represent a fluorine atom, a perfluoroalkyl group having 1 to 5 carbon atoms, or a perfluoroalkoxy group having 1 to 5 carbon atoms. One or some of the fluorine atoms are each optionally substituted by a halogen atom other than a fluorine atom. One or some of fluorine atoms in the perfluoroalkyl group are each optionally substituted by a halogen atom other than a fluorine atom. One or some of fluorine atoms in the perfluoroalkoxy group are each optionally substituted by a halogen atom other than a fluorine atom.

Symbols s and t are each independently 0 to 5, and s+t is an integer of 1 to 6 or, in the case where Z is —OC($R^{19}R^{20}$)O—, s+t is optionally 0.

The structural unit (D) is preferably represented by the following formula (9). The structural unit represented by the following formula (9) is a structural unit represented by the above formula (4), where Z is an oxygen atom, s is 0, and t is 2.

(9)

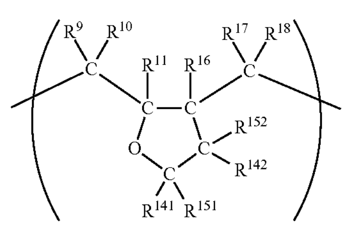

In the formula (9), $R^{141}$, $R^{142}$, $R^{151}$, and $R^{152}$ are each independently a fluorine atom, a perfluoroalkyl group having 1 to 5 carbon atoms, or a perfluoroalkoxy group having 1 to 5 carbon atoms. One or some of the fluorine atoms are each optionally substituted by a halogen atom other than a fluorine atom. One or some of fluorine atoms in the perfluoroalkyl group are each optionally substituted by a halogen atom other than a fluorine atom. One or some of fluorine atoms in the perfluoroalkoxy group are each optionally substituted by a halogen atom other than a fluorine atom.

The fluorine-containing polymer may include one or more structural units (D). In the fluorine-containing polymer, the amount of the structural unit (D) is preferably 30 to 67 mol % of the total amount of all structural units. The amount of the structural unit (D) is, for example, 35 mol % or more, and may be 60 mol % or less or 55 mol % or less.

The structural unit (D) is, for example, derived from a compound represented by the following formula (10). In the formula (10), Z, $R^9$ to $R^{18}$, s, and t are as described for the formula (4). The compound represented by the formula (10) is a cyclopolymerizable fluorine-containing compound having two or more polymerizable double bonds.

(10)

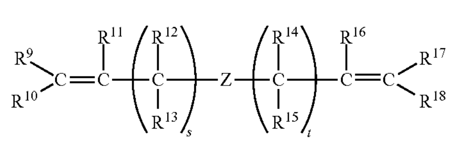

The structural unit (D) is preferably derived from a compound represented by the following formula (11). In the formula (11), $R^{141}$, $R^{142}$, $R^{151}$, and $R^{152}$ are as described for the formula (9).

(11)

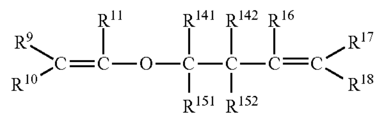

Specific examples of the compound represented by the formula (10) or the formula (11) include the following compounds.

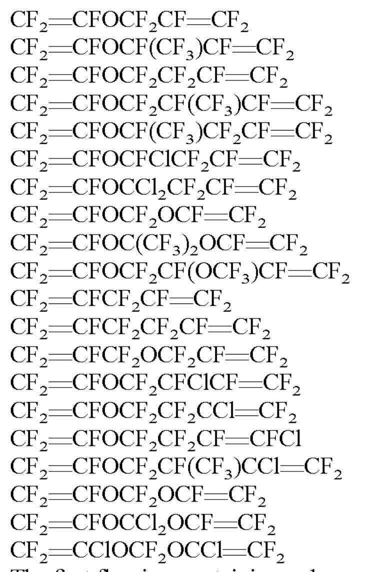

$CF_2=CFOCF_2CF=CF_2$ $CF_2=CFOCF(CF_3)CF=CF_2$ $CF_2=CFOCF_2CF_2CF=CF_2$ $CF_2=CFOCF_2CF(CF_3)CF=CF_2$ $CF_2=CFOCF(CF_3)CF_2CF=CF_2$ $CF_2=CFOCFClCF_2CF=CF_2$ $CF_2=CFOCCl_2CF_2CF=CF_2$ $CF_2=CFOCF_2OCF=CF_2$ $CF_2=CFOC(CF_3)_2OCF=CF_2$ $CF_2=CFOCF_2CF(OCF_3)CF=CF_2$ $CF_2=CFCF_2CF=CF_2$ $CF_2=CFCF_2CF_2CF=CF_2$ $CF_2=CFCF_2OCF_2CF=CF_2$ $CF_2=CFOCF_2CFClCF=CF_2$ $CF_2=CFOCF_2CF_2CCl=CF_2$ $CF_2=CFOCF_2CF_2CF=CFCl$ $CF_2=CFOCF_2CF(CF_3)CCl=CF_2$ $CF_2=CFOCF_2OCF=CF_2$ $CF_2=CFOCCl_2OCF=CF_2$ $CF_2=CClOCF_2OCCl=CF_2$

The first fluorine-containing polymer may further include an additional structural unit other than the structural units (A) to (D). However, the first fluorine-containing polymer is preferably substantially free of an additional structural unit other than the structural units (A) to (D). Saying that the fluorine-containing polymer is substantially free of an additional structural unit other than the structural units (A) to (D) means that the sum of the amounts of the structural units (A) to (D) is 95 mol % or more and preferably 98 mol % or more of the total amount of all structural units in the fluorine-containing polymer.

The polymerization method for the first fluorine-containing polymer is not limited to a particular one, and a common polymerization method such as radical polymerization can be used. A polymerization initiator for the polymerization of the fluorine-containing polymer may be a fully-fluorinated compound.

The first fluorine-containing polymer makes up the first fluorine-containing resin used as the first resin. As described above, the first resin has a first glass transition temperature $Tg_1$ of 120° C. or higher. Therefore, a glass transition temperature of the first fluorine-containing polymer is preferably 120° C. or higher, more preferably 125° C. or higher, and even more preferably 130° C. or higher.

The refractive index of the core 11 is not limited to a particular value as long as the refractive index of the core 11 is higher than the refractive index of the clad 12. To achieve the POF 10 having a high numerical aperture, it is preferred that a difference between the refractive index of the core 11 and the refractive index of the clad 12 be large at a wavelength of light used. For example, the refractive index of the core 11 can be 1.340 or more or even 1.360 or more at a wavelength of light used (e.g., a wavelength of 850 nm). The upper limit of the refractive index of the core is, for example, but not particularly limited to, 1.4000 or less.

(Clad 12)

As described above, in the POF 10 of the present embodiment, the clad 12 includes the second resin. The clad 12 may include the second resin as its main component. Here, saying that the clad 12 includes the second resin as its main component means that the second resin is a component whose content is highest in the clad 12 on a mass basis. The second resin content in the clad 12 may be 80 mass % or more, 90 mass % or more, or 95 mass % or more. The clad 12 may consist of the second resin. The clad 12 may further include an additive in addition to the second resin.

The second resin included in the clad 12 is not limited to a particular resin as long as the second resin has a high transparency. Examples of the second resin include fluorine-containing resins, acrylic resins such as methyl methacrylate, styrene resins, and carbonate resins. Among these, a fluorine-containing resin is preferably used because, in that case, a low transmission loss can be achieved in a wide wavelength region.

The second resin of the clad 12 is preferably a fluorine-containing resin including a fluorine-containing polymer. Hereinafter, the fluorine-containing resin included in the clad 12 is referred to as a second fluorine-containing resin, and the fluorine-containing polymer included in the second fluorine-containing resin is referred to as a second fluorine-containing polymer.

Examples of the fluorine-containing resin that can be used as the second fluorine-containing resin are the same as those mentioned as examples of the fluorine-containing resin that can be used as the first fluorine-containing resin. That is, examples of the fluorine-containing polymer that can be used as the second fluorine-containing polymer are the same as those mentioned as examples of the fluorine-containing polymer that can be used as the first fluorine-containing polymer.

The second fluorine-containing polymer makes up the second fluorine-containing resin used as the second resin. As described above, the second resin has a second glass transition temperature $Tg_2$ of 120° C. or higher. Therefore, the glass transition temperature of the second fluorine-containing polymer is preferably 120° C. or higher, more preferably 125° C. or higher, and even more preferably 130° C. or higher.

It is preferred that the second resin, which may be a resin different from the first resin, have an affinity for the first resin. For example, the second resin may include the same polymerization unit as that in the first resin, or may be the same as the first resin. In these cases, delamination at the interface between the core 11 and the clad 12 is less likely to occur and, for example, a transmission loss can be reduced.

The refractive index of the clad 12 is not limited to a particular value as long as the refractive index of the clad 12 is determined on the basis of the refractive index of the core 11. The clad 12 may have a refractive index of, for example, 1.310 or less or even 1.300 or less at a wavelength of light used (e.g., a wavelength of 850 nm).

Figure 2:
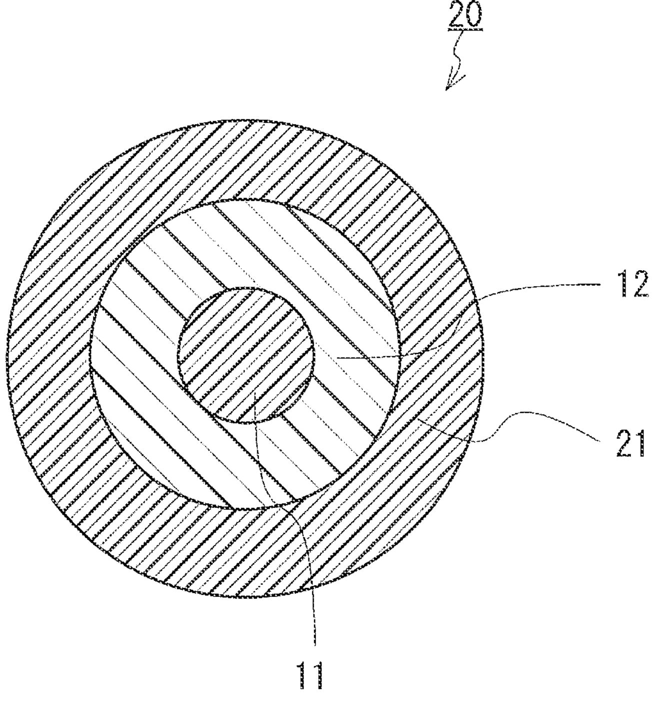
FIG. 2 is a schematic diagram showing another example of the cross-sectional structure of the plastic optical fiber according to the embodiment of the present invention.

FIG. 2 shows a variation of the POF of the present embodiment. A POF 20 as shown in FIG. 2 has a configuration in which the POF 10 is further provided with a reinforcing layer 21 disposed on the outer circumference of the clad 12. The reinforcing layer 21 is provided to improve the mechanical strength of the POF 10. For example, a material and a configuration of a reinforcing layer of a known POF can be applied to the reinforcing layer 21. Examples of the material of the reinforcing layer 21 include various engineering plastics such as a polycarbonate, a polyester, a cycloolefin polymer, a cycloolefin copolymer, polytetrafluoroethylene (PTFE), a modified PTFE, a tetrafluoroethylene-perfluoroalkoxyethylene copolymer (PFA), a copolymer thereof, and a mixture thereof.

A dimension retention rate of the POF 20 of the present embodiment including the reinforcing layer 21 after exposure to 105° C. for 250 hours can be, for example, 95% or more. The dimension retention rate of the POF 20 of the present embodiment after exposure to 105° C. for 250 hours can be, for example, 96% or more, or 98% or more. The term "dimension retention rate" herein refers to a ratio of a length of the POF 20 after exposure to 105° C. for 250 hours to a length of the POF 20 before the exposure to 105° C. for 250 hours.

Since the POF of the present embodiment can have both heat resistance and flexibility, the POF can be used also in applications where the POF is required to have a high heat resistance and a high flexibility. The POF of the present embodiment can also be included in, for example, a hybrid cable, a patch cord, an active optical cable, etc.

Figure 3:
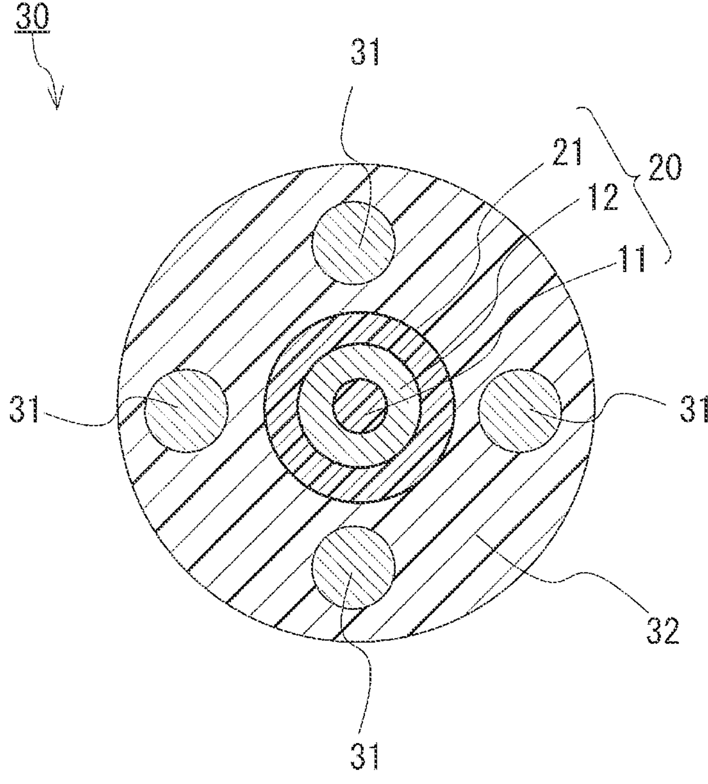
FIG. 3 is a cross-sectional view showing an example of a hybrid cable according to an embodiment of the present invention.

FIG. 3 is a cross-sectional view showing an example of a hybrid cable including the POF 20 of the present embodiment. A hybrid cable 30 as shown in FIG. 3 includes the POF 20 of the present embodiment, a plurality of conducting wires 31 disposed around the POF 20, and a coating layer 32 covering the POF 20 and the conducting wires 31.

Figure 4:
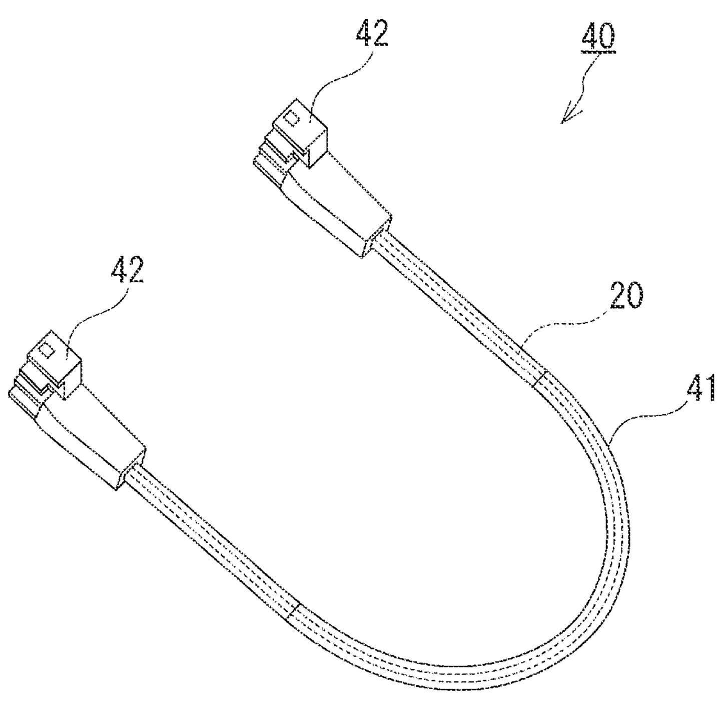
FIG. 4 is a schematic diagram showing an example of a patch cord according to an embodiment of the present invention.

FIG. 4 is a schematic diagram showing an example of a patch cord including the POF 20 of the present embodiment. A patch cord 40 as shown in FIG. 4 includes: a cable 41 including the POF 20 of the present embodiment; and a connector 42 attached to at least one end portion of the cable 41.

Figure 5:
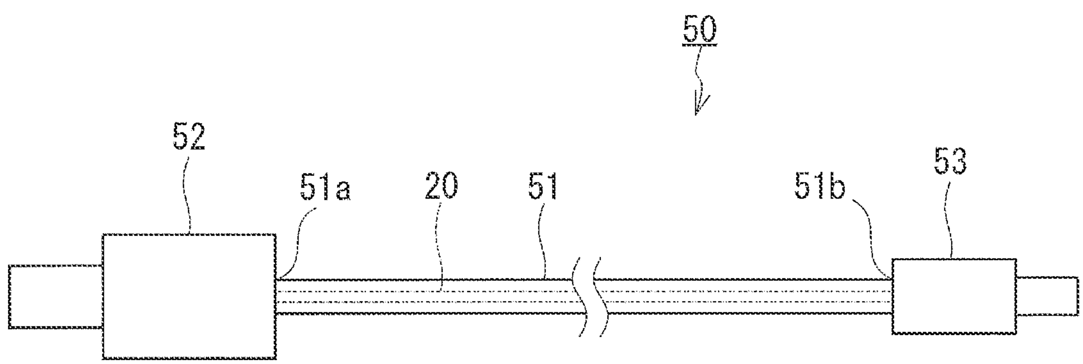
FIG. 5 is a schematic diagram showing an example of an active optical cable according to an embodiment of the present invention.

FIG. 5 is a schematic diagram showing an example of an active optical cable including the POF 20 of the present embodiment. An active optical cable 50 as shown in FIG. 5 includes: a cable 51 including the POF 20 of the present embodiment; a first connector 52 attached to a first end portion 51*a* of the cable 51 and including a first converter (not illustrated) that converts an electrical signal into an optical signal; and a second connector 53 attached to a second end portion 51*b* of the cable 51 and including a second converter (not illustrated) that converts an optical signal into an electrical signal.

(POF Production Method)

The POF of the present embodiment is produced, for example, by melt spinning. That is, one example of the method for producing the POF of the present embodiment includes:

- producing a fiber-shaped molded body made of a core material by melting the core material and extrusion-molding the molten core material into a fiber shape;
- producing a layered body by melting a clad material and extrusion-molding the molten clad material to cover a surface of the molded body, the layered body including the core material and the clad material concentrically layered; and
- drawing down the layered body under heating at a given drawing temperature to spin the layered body. The above core material includes the first resin, and the above clad material includes the second resin.

In the POF of the present embodiment, both the first resin included in the core and the second resin included in the clad have as high a glass transition temperature as 120° C. or higher and have such an excellent flexibility, for example, that the minimum curvature radius is 5 mm or less. To achieve such an excellent flexibility using the resins having a high glass transition temperature, for example, the first resin and the second resin are preferably highly oriented in the core and the clad. To produce the core and the clad such that the molecular chains of the first resin and the second resin are highly aligned in the fiber axis direction, for example, the drawing temperature of the layered body including the core material and the clad material concentrically layered is set to a temperature at which the molecular chains of the first resin and the second resin are highly aligned in the fiber axis direction. The drawing temperature of a layered body is commonly determined in view of the glass transition temperatures of a core material and a clad material of the layered body. Unlike the common case, in the present embodiment, the drawing temperature of the layered body is preferably set to a temperature lower than a conventionally common drawing temperature so that the molecular chains of the first resin and the second resin will be highly aligned in the fiber axis direction, the conventionally common drawing temperature being determined in view of the glass transition temperatures of a core material and a clad material. The drawing temperature of the layered body may be determined in view of, for example, the glass transition temperatures of the first resin used and the second resin used, and a proportion of the additive, such as the refractive index modifier, in the core material, and is not limited to a particular temperature. The drawing temperature of the layered body is desirably so low that a POF produced from the layered body will not break.

In terms of the first glass transition temperature $Tg_1$ of the first resin, the drawing temperature of the layered body is, for example, preferably in the range of $Tg_1$+50° C. to $Tg_1$+150° C., more preferably in the range of $Tg_1$+70° C. to $Tg_1$+140° C. Moreover, in terms of the second glass transition temperature $Tg_2$ of the second resin, the drawing temperature of the layered body is preferably in the range of $Tg_2$+50° C. to $Tg_2$+150° C., more preferably in the range of $Tg_1$+70° C. to $Tg_1$+140° C. In the case where the core material includes the refractive index modifier and is a resin composition including the first resin and the refractive index modifier, the drawing temperature is, in terms of a glass transition temperature $Tg_{1a}$ of the resin composition, preferably in the range of $Tg_{1a}$+60° C. to $Tg_{1a}$+170° C., more preferably in the range of $Tg_{1a}$+80° C. to $Tg_{1a}$+160° C. It is desirable that an appropriate temperature be selected from the above preferred temperature ranges determined in view of the first glass transition temperature $Tg_1$ of the first resin used, the glass transition temperature $Tg_{1a}$ of the resin composition including the first resin and the refractive index modifier, and the second glass transition temperature $Tg_2$ of the second resin and be determined as the drawing temperature. The drawing temperature determined as described above makes it possible to produce a POF, for example, in which the birefringence of the fiber structure composed of the core and the clad satisfies $2.0\times10^{-4}$ or more and in which the first resin and the second resin are highly oriented in the fiber axis direction.

Figure 6:
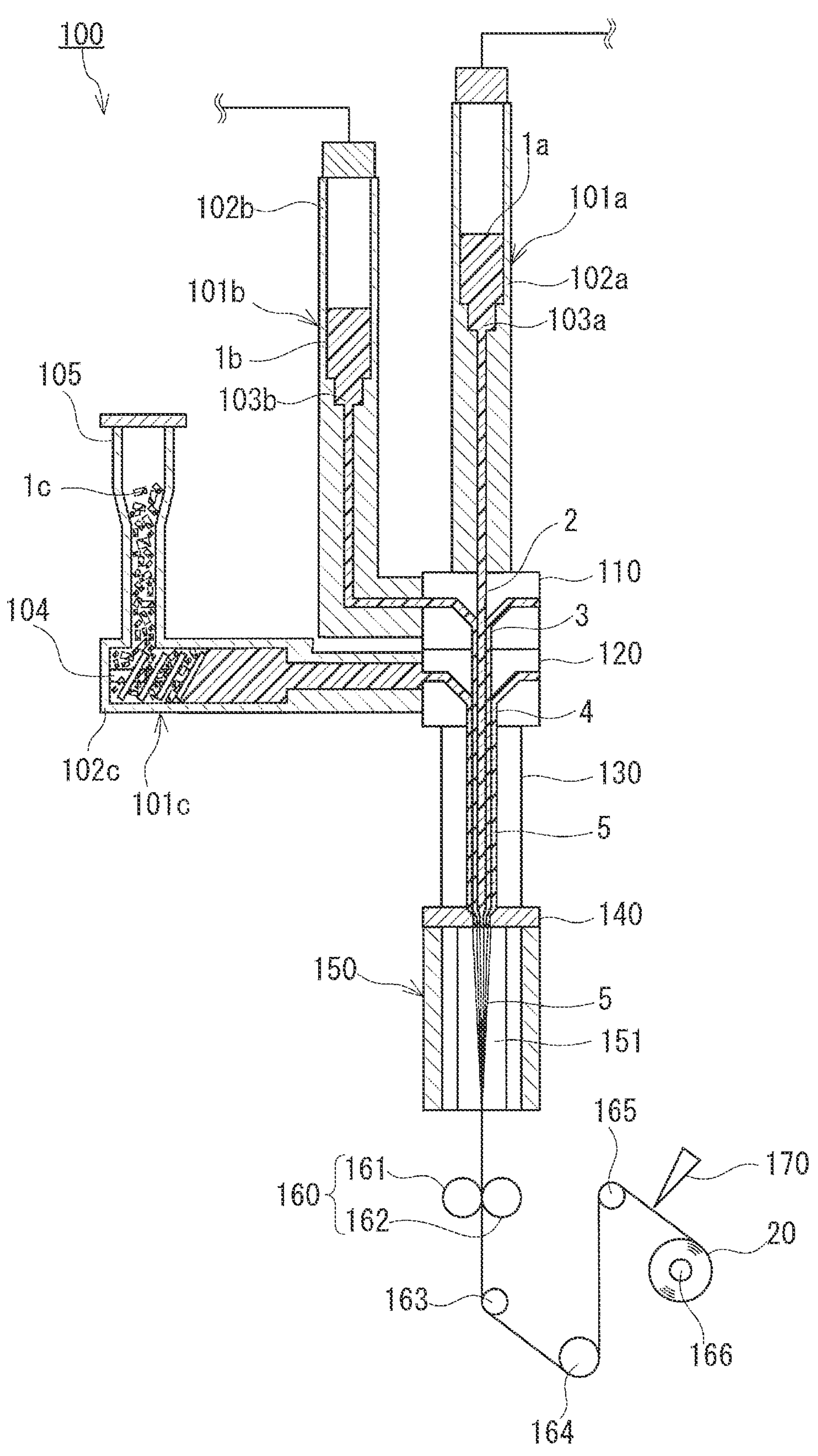
FIG. 6 is a schematic cross-sectional view showing an example of a production apparatus capable of being used for production of the plastic optical fiber according to the embodiment of the present invention.

FIG. 6 is a schematic cross-sectional view showing an example of a production apparatus that can be used in production of the POF 20 of the present embodiment.

An apparatus 100 shown in FIG. 6 includes a first extrusion apparatus 101*a* for core formation, a second extrusion apparatus 101*b* for clad formation, and a third extrusion apparatus 101*c* for reinforcing layer formation. The apparatus 100 further includes a first chamber 110 and a second chamber 120. The first chamber 110 and the second chamber 120 are vertically arranged in this order from top to bottom.

The first extrusion apparatus 101*a* includes a first holding portion 102*a* that holds a core material 1*a* and a first extrusion portion 103*a* that extrudes the core material 1*a* held in the first holding portion 102*a* from the first holding portion 102*a*. The first extrusion apparatus 101*a* may be further provided with a heating unit (not illustrated) such as a heater so that the core material 1*a* can be molten in the first holding portion 102*a* and that the molten core material 1*a* can be kept in a molten state until molded. In this case, for example, the core material (preform) 1*a* in a rod shape can be molten by being put in the first holding portion 102*a* through an upper opening portion of the first holding portion 102*a* and then being heated in the first holding portion 102*a*.

In the first extrusion apparatus 101*a*, the core material 1*a* is extruded from the first holding portion 102*a* through the first extrusion portion 103*a*, for example, by extrusion by gas to form a core 2. The core material 1*a* extruded through the first extrusion portion 103*a* to form the core 2 then moves vertically downward to be supplied to the first chamber 110 and the second chamber 120 in this order.

A second extrusion apparatus 101*b* includes a second holding portion 102*b* that holds a clad material 1*b* and a second extrusion portion 103*b* that extrudes the clad material 1*b* held in the second holding portion 102*b* from the second holding portion 102*b*. The second extrusion apparatus 101*b* extrudes the clad material 1*b* in a molten state to cover an outer circumference of the core 2 made of the core material 1*a* extruded from the first extrusion apparatus 102*a*. Specifically, the clad material 1*b* extruded from the second extrusion apparatus 101*b* is supplied to the first chamber 110. In the first chamber 110, a clad 3 covering the outer circumference of the core 2 can be formed by covering the core 2 made of the core material 1*a* with the clad material 1*b*. A layered body made of the core 2 and the clad 3 covering the outer circumference of the core 2 moves from the first chamber 110 to the second chamber 120.

The third extrusion apparatus 101*c* includes, for example, a third holding portion 102*c* that holds a reinforcing layer material 1*c*, a screw 104 disposed in the third holding portion 102*c*, and a hopper 105 connected to the third holding portion 102*c*. In the third extrusion apparatus 101*c*, for example, the reinforcing layer material 1*c* in a pellet shape is supplied to the third holding portion 102*c* through the hopper 105. The reinforcing layer material 1*c* supplied to the third holding portion 102*c* becomes soft and flowable, for example, by being kneaded by the screw 104 under heating. The softened reinforcing layer material 1*c* is extruded from the third holding portion 102*c* by the screw 104.

The reinforcing layer material 1*c* extruded from the third extrusion apparatus 101*c* is supplied to the second chamber 120. A reinforcing layer 4 covering the outer circumference of the clad 3 can be formed in the second chamber 120 by covering a surface of the layered body made of the core 2 and the clad 3 with the reinforcing layer material 1*c*.

A layered body 5 including the core 2, the clad 3, and the reinforcing layer 4 concentrically layered moves from the second chamber 120 to a diffusion tube 130 disposed vertically under the second chamber 120. For example, a heater (not illustrated) for heating the layered body may be disposed in the diffusion tube 130. In the diffusion tube 130, for example, the temperature and the viscosity of the layered body 5 passing inside are adjusted as appropriate. The drawing temperature of the layered body 5 passing through the diffusion tube 130 is desirably set in the above-described temperature ranges. That is, in terms of the first glass transition temperature $Tg_1$ of the first resin included in the core material 1*a*, the drawing temperature of the layered body 5 in the diffusion tube 130 is preferably in the range of $Tg_1$+50° C. to $Tg_1$+150° C., more preferably in the range of $Tg_1$+70° C. to $Tg_1$+140° C. Moreover, in terms of the second glass transition temperature $Tg_2$ of the second resin included in the clad material, the drawing temperature of the layered body 5 is preferably in the range of $Tg_2$+50° C. to $Tg_2$+150° C., more preferably in the range of $Tg_1$+70° C. to $Tg_1$+140° C. Furthermore, in terms of the glass transition temperature $Tg_{1a}$ of the resin composition being the core material 1*a*, the drawing temperature of the layered body 5 is preferably in the range of $Tg_{1a}$+60° C. to $Tg_{1a}$+170° C., more preferably in the range of $Tg_{1a}$+80° C. to $Tg_{1a}$+160° C. The diffusion tube 130 can disperse a dopant such as a refractive index modifier in the layered body 5, the dopant being included in the layered body 5 passing through the diffusion tube 130.

The diffusion tube 130 communicates with an internal flow path of the nozzle 140. That is, a lower opening portion of the diffusion tube 130 communicates with an inlet of the nozzle 140, and the layered body 5 having passed through the diffusion tube 130 flows into the internal flow path through the inlet of the nozzle 140. The layered body 5 passes through the internal flow path to be reduced in diameter, and is then discharged into a fiber shape through an outlet of the nozzle 140.

The positions of the second chamber 120 and the diffusion tube 130 may be exchanged. That is, the apparatus may have a configuration in which the diffusion tube 130 is disposed below the first chamber 110, the second chamber 120 is disposed below the diffusion tube 130, and the nozzle 140 is installed below the second chamber.

The layered body 5 discharged into a fiber shape through the outlet of the nozzle 140 flows, for example, into an internal space 151 of a cooling pipe 150. The layered body 5 is cooled while passing through the internal space 151. The layered body 5 is then discharged from the cooling pipe 150 through an opening portion. The layered body 5 discharged from the cooling pipe 150, for example, passes between two rolls 161 and 162 of a nip roll 160 and then along guide rolls 163 to 165, and is wound as the POF 20 around a winding roll 166. A displacement meter 170 for measuring the outer diameter of the POF 20 may also be provided near the winding roll 166, such as between the guide roll 165 and the winding roll 166.

EXAMPLES

Hereinafter, the present invention will be described in more detail with reference to Examples and Comparative Examples. The present invention is however not limited by these.

Example 1

[Production of First Fluorine-Containing Resin and Second Fluorine-Containing Resin]

A polymer of perfluoro-4-methyl-2-methylene-1,3-dioxolane (PFMMD, the compound represented by the above formula (M2)) was prepared as the first fluorine-containing resin and the second fluorine-containing resin. The perfluoro-4-methyl-2-methylene-1,3-dioxolane was synthesized by synthesizing 2-carbomethyl-2-trifluoromethyl-4-methyl-1,3-dioxolane, fluorinating the 2-carbomethyl-2-trifluoromethyl-4-methyl-1,3-dioxolane, and then decarboxylating the resulting carboxylic acid salt. In the polymerization of the perfluoro-4-methyl-2-methylene-1,3-dioxolane, perfluorobenzoyl peroxide was used as a polymerization initiator.

The synthesis of 2-carbomethyl-2-trifluoromethyl-4-methyl-1,3-dioxolane, the fluorination of 2-carbomethyl-2-trifluoromethyl-4-methyl-1,3-dioxolane, the synthesis of perfluoro-4-methyl-2-methylene-1,3-dioxolane, and the polymerization of perfluoro-4-methyl-2-methylene-1,3-dioxolane will be described hereinafter in details.

Synthesis of 2-carbomethyl-2-trifluoromethyl-4-methyl-1,3-dioxolane

A 3 L three-neck flask equipped with a water-cooled chiller, a thermometer, a magnetic stirrer, and a pressure equalizing dropping funnel were prepared. An amount of 139.4 g (1.4 mols in total) of a mixture of 2-chloro-1-propanol and 1-chloro-2-propanol was put in the flask. The flask was cooled to 0° C., methyl trifluoropyruvate was slowly added thereto, and the contents were stirred for 2 hours. An amount of 100 mL of dimethyl sulfoxide (DMSO) and 194 g of potassium carbonate were added thereto over 1 hour, and the contents were stirred for 8 hours to obtain a reaction mixture. The reaction mixture generated was mixed with 1 L of water, and an aqueous phase of the resulting mixture was separated. After extraction was performed with dichloromethylene, the dichloromethylene solution was mixed with an organic reaction mixture phase. The resulting solution was dried by magnesium sulfate. After the removal of the solvent, 245.5 g of an unrefined product was obtained. This unrefined product was fractionated under a reduced pressure (12 Torr) to obtain 230.9 g of a purified product, 2-carbomethyl-2-trifluoromethyl-4-methyl-1,3-dioxolane. The boiling point of the purified product was 77 to 78° C., and the percentage yield was 77%. HNMR and $^{19}F$ NMR were used to confirm that the obtained purified product was 2-carbomethyl-2-trifluoromethyl-4-methyl-1,3-dioxolane.

HNMR (ppm): 4.2 to 4.6, 3.8 to 3.6 ($CHCH_2$, muliplet, 3H), 3.85 to 3.88 ($COOCH_3$, multiplet, 3H), 1.36 to 1.43 ($CCH_3$, multiplet, 3H)

$^{19}F$ NMR (ppm): −81.3 ($CF_3$, s, 3F)

Fluorination of 2-carbomethyl-2-trifluoromethyl-4-methyl-1,3-dioxolane

An amount of 4 L of 1,1,2-trichlorotrifluoroethane was introduced into a 10 L stirred reaction vessel. In the stirred reaction vessel, nitrogen and fluorine were allowed to flow at a flow rate of 1340 cc/min and 580 cc/min, respectively, to create a nitrogen-fluorine atmosphere. Five minutes later, 290 g of the 2-carbomethyl-2-trifluoromethyl-4-methyl-1,3-dioxolane prepared beforehand was dissolved in 750 mL of a 1,1,2-trichlorotrifluoroethane solution, which was then added into the reaction vessel at 0.5 ml/min. The reaction vessel was cooled to 0° C. After the dioxolan was all added over 24 hours, the fluorine gas flow was stopped. The nitrogen gas was purged, and subsequently an aqueous potassium hydroxide solution was added until the mixture became weak alkaline.

After a volatile substance was removed under a reduced pressure, the reaction vessel was cooled. The cooling was followed by a 48-hour drying under a reduced pressure at 70° C. to obtain a solid reaction product. The solid reaction product was dissolved in 500 mL of water, to which an excessive amount of hydrochloric acid was added to separate the mixture into an organic phase and an aqueous phase. The organic phase was separated and distilled under a reduced pressure to obtain perfluoro-2,4-dimethyl-1,3-dioxolane-2-carboxylic acid. The boiling point of the main distillate was 103° C.-106° C./100 mmHg. The percentage yield of the fluorination was 85%.

Synthesis of perfluoro-4-methyl-2-methylene-1,3-dioxolane

The above distillate was neutralized with an aqueous potassium hydroxide solution to obtain perfluoro-2,4-dimethyl-2-potassium carboxylate-1,3-dioxolane. This potassium salt was vacuum-dried at 70° C. for 1 day. The salt was decomposed at 250° C. to 280° C. under a nitrogen or argon atmosphere. Through condensation in a cold trap cooled at −78° C., perfluoro-4-methyl-2-methylene-1,3-dioxolane was obtained at a percentage yield of 82%. The boiling point of the product was 45° C./760 mmHg. The product was identified by $^{19}F$ NMR and GC-MS.

$^{19}F$ NMR: −84 ppm (3F, $CF_3$), −129 ppm (2F, $=CF_2$)

GC-MS: m/e244 (Molecular ion) 225, 197, 169, 150, 131, 100, 75, 50.

Polymerization of perfluoro-4-methyl-2-methylene-1,3-dioxolane

An amount of 100 g of the perfluoro-4-methyl-2-methylene-1,3-dioxolane obtained in the above manner and 1 g of perfluorobenzoyl peroxide were put in a glass tube, which was then sealed. After oxygen in the system was removed by freeze-pump-thaw cycling, the glass tube was charged with argon and then heated at 50° C. for several hours. The contents thereby turned solids, which were further heated at 70° C. overnight to obtain 100 g of a transparent stick.

The transparent stick obtained was dissolved in Fluorinert FC-75 (manufactured by Sumitomo 3M), and the resulting solution was poured onto a glass sheet to obtain a thin polymer film. The polymer had a glass transition temperature of 117° C., and was completely amorphous. The transparent stick was dissolved in a hexafluorobenzene solution, to which chloroform was added for precipitation. The product was thereby purified. A polymer resulting from the purification had a glass transition temperature of approximately 131° C. This polymer was used as the first fluorine-containing resin and the second fluorine-containing resin.

[Refractive Index Modifier]

A chlorotrifluoroethylene oligomer (molecular weight: 585) was used as a refractive index modifier. Specifically, only a component obtained by distillation of DAIFLOIL #10 manufactured by DAIKIN INDUSTRIES, LTD. was used, the component having a molecular weight of 585.

[Core Material]

The first fluorine-containing resin produced in the above manner and the above refractive index modifier were molten and mixed at 260° C. to produce a resin composition. The refractive index modifier concentration in the resin composition was 3 mass %. This resin composition was used as a core material.

[Clad Material]

The second fluorine-containing resin produced in the above manner was used as a clad material.

[Reinforcing Layer Material]

Xylex (manufactured by SABIC Innovative Plastics; glass transition temperature: 113° C.) was used as a reinforcing layer material.

[POF]

A POF having the same configuration as that of the POF 20 as shown in FIG. 2 was produced. The POF having the same configuration as that of the POF 20 as shown in FIG. 2 was produced by melt spinning using the core material, the clad material, and the reinforcing layer prepared in the above manners. The production apparatus 100 as shown in FIG. 6 was used for the production of the POF. The core material had a melting temperature of 250° C., the clad material had a melting temperature of 255° C., and the reinforcing layer material had a melting temperature of 240° C. The temperature of the diffusion tube was set to 220° C. That is, the drawing temperature of a layered body composed of the core, the clad, and the reinforcing layer was 220° C. In the resulting POF, the outer diameter of the core was 80 μm, the outer diameter of the clad was 125 μm, and the outer diameter of the reinforcing layer (namely, the outer diameter of the POF) was 490 μm.

[Evaluation of Degree of Orientation of Fiber Structure Composed of Core and Clad]

The degree of orientation was evaluated by measuring a birefringence. The reinforcing layer was eliminated from the produced POF to obtain a fiber structure composed of the core and the clad. The reinforcing layer was eliminated by immersing the POF in methylene chloride and dissolving the reinforcing layer only. The birefringence of the fiber structure was measured from a side of the fiber structure using WPA-micro manufactured by Photonic Lattice, Inc. Table 1 shows the result of the measurement of the birefringence.

[Evaluation of Flexibility]

A 180-degree bending test was performed for the produced POF at curvature radii R of 10 mm, 5 mm, 2.5 mm, 2 mm, and 1 mm at 25° C. Test tools each with a groove having a curvature radius R of 10 mm, 5 mm, 2.5 mm, 2 mm, or 1 mm were prepared. The POF was put in the groove of each tool to bend the POF 180 degrees, and was then unbent. The bent portion of the POF was observed using a microscope (magnification: 200) to confirm whether there was a crack. The POF was bent once at each curvature radius. Table 1 shows the bending test result. In Table 1, "○" represents observation of no cracks while "×" represents observation of a crack.

[Evaluation of Heat Resistance]

The produced POF was cut to a length of 1 m, and was put in an oven at 105° C. The POF was taken out 250 hours later, and was measured for its length. A ratio of the length of the POF after the exposure to 105° C. for 250 hours to the length of the POF before the exposure to 105° C. for 250 hours was determined as a dimension retention rate. Table 1 shows the dimension retention rate.

Example 2

In POF production, the temperature of the diffusion tube was set to 230° C. A POF was produced in the same manner as in Example 1, except for this point. In the resulting POF, the outer diameter of the core was 80 μm, the outer diameter of the clad was 125 μm, and the outer diameter of the reinforcing layer (namely, the outer diameter of the POF) was 490 μm. The POF was evaluated for its properties in the same manner as in Example 1. Table 1 shows the results.

Example 3

In POF production, the temperature of the diffusion tube was set to 260° C. Moreover, the refractive index modifier concentration in the core material was 8 mass %. A POF was produced so that the outer diameter of the core would be 52 μm, the outer diameter of the clad would be 55 μm, and the outer diameter of the reinforcing layer (namely, the outer diameter of the POF) would be 232 μm. The production of the POF was performed in the same manner as in Example 1, except for these points. The POF was evaluated for its properties in the same manner as in Example 1. Table 1 shows the results.

Example 4

In POF production, the temperature of the diffusion tube was set to 260° C. The refractive index modifier concentration in the core material was 12 mass %. A POF was produced so that the outer diameter of the core would be 47 μm, the outer diameter of the clad would be 49 μm, and the outer diameter of the reinforcing layer (namely, the outer diameter of the POF) of 232 μm. The production of the POF was performed in the same manner as in Example 1, except for these points. The POF was evaluated for its properties in the same manner as in Example 1. Table 1 shows the results.

Comparative Example 1

Giga-POF62SR manufactured by Chromis Fiberoptics, Inc. was used as a POF of Comparative Example 1 and evaluated for its flexibility and heat resistance. In the POF of Comparative Example 1, the outer diameter of the core was 62.5 μm, the outer diameter of the clad was 90 μm, and the outer diameter of the reinforcing layer (namely, the outer diameter of the POF) was 490 μm. In the POF of Comparative Example 1, the resin used as the first fluorine-containing resin and the second fluorine-containing resin was a perfluoro(butenyl vinyl ether) (PBVE) polymer. The refractive index modifier used was perfluoro-1,3,5-triphenylbenzene. The reinforcing layer material was Xylex (manufactured by SABIC; glass transition temperature: 113° C.).

[Evaluation of Properties]

The properties were evaluated in the same manner as in Example 1.

Comparative Example 2

In POF production, the temperature of the diffusion tube was set to 250° C. A POF was produced in the same manner as in Example 1, except for this point. In the resulting POF, the outer diameter of the core was 80 μm, the outer diameter of the clad was 125 μm, and the outer diameter of the reinforcing layer (namely, the outer diameter of the POF) was 490 μm. The POF was evaluated for its properties in the same manner as in Example 1. Table 1 shows the results.

Comparative Example 3

The refractive index modifier concentration in the core material was 10 mass % and, moreover, in POF production, the temperature of the diffusion tube was set to 230° C. A POF was produced in the same manner as in Example 1, except for these points. In the resulting POF, the outer diameter of the core was 80 μm, the outer diameter of the clad was 125 μm, and the outer diameter of the reinforcing layer (namely, the outer diameter of the POF) was 490 μm. The POF was evaluated for its properties in the same manner as in Example 1. Table 1 shows the results.

Comparative Example 4

A POF was produced in the same manner as in Example 1, except for the following points.

The refractive index modifier concentration in the core material was 10 mass %.

DURABIO T-7450 (manufactured by Mitsubishi Chemical Corporation; glass transition temperature: 129° C.) was used as the reinforcing layer material.

The reinforcing layer material had a melting temperature of 230° C.

The temperature of the diffusion tube was 230° C. in the POF production.

In the resulting POF, the outer diameter of the core was 80 μm, the outer diameter of the clad was 125 μm, and the outer diameter of the reinforcing layer (namely, the outer diameter of the POF) was 490 μm.

The properties were evaluated in the same manner as in Example 1. Table 1 shows the results.

Comparative Example 5

A POF was produced in the same manner as in Example 1, except for the following points.

The refractive index modifier concentration in the core material was 10 mass %.

DURABIO T-7450 (manufactured by Mitsubishi Chemical Corporation; glass transition temperature: 129° C.) was used as the reinforcing layer material.

The reinforcing layer material had a melting temperature of 230° C.

The temperature of the diffusion tube was 240° C. in the POF production.

In the resulting POF, the outer diameter of the core was 80 μm, the outer diameter of the clad was 125 μm, and the outer diameter of the reinforcing layer (namely, the outer diameter of the POF) was 490 μm.

The properties were evaluated in the same manner as in Example 1. Table 1 shows the results.

TABLE 2

| | Outer diameter of clad (diameter) | Degree of orientation (birefringence of core + clad) | Degree of orientation ÷ Outer diameter of clad (radius; unit: m) |
|---|---|---|---|
| Example 1 | 125 μm | $6.6 \times 10^{-4}$ | 10.6 |
| Example 2 | 125 μm | $2.7 \times 10^{-4}$ | 4.35 |
| Example 3 | 55 μm | $3.0 \times 10^{-4}$ | 10.9 |
| Example 4 | 49 μm | $2.2 \times 10^{-4}$ | 8.95 |
| Comparative Example 1 | 62.5 μm | $2.0 \times 10^{-4}$ | 6.24 |
| Comparative Example 2 | 125 μm | $0.5 \times 10^{-4}$ | 0.80 |
| Comparative Example 3 | 125 μm | $1.9 \times 10^{-4}$ | 3.03 |
| Comparative Example 4 | 125 μm | $1.8 \times 10^{-4}$ | 2.88 |
| Comparative Example 5 | 125 μm | $0.6 \times 10^{-4}$ | 0.99 |

TABLE 1

| | Core material Clad material | | | Evaluation of degree of orientation | Evaluation of flexibility (180-degree bending test) | | | | | | Evaluation of heat resistance |
|---|---|---|---|---|---|---|---|---|---|---|---|
| | First resin Second resin | Tg of core material | Reinforcing layer material | Birefringence of core + clad | Curvature radius 10 mm | 5 mm | 2.5 mm | 2 mm | 1 mm | Minimum curvature radius | Dimension retention rate (%) |
| Example 1 | PFMMD polymer (Tg: 131° C.) | 125° C. | Xylex | $6.6 \times 10^{-4}$ | ○ | ○ | ○ | ○ | x | Less than 2 mm | 96.6 |
| Example 2 | PFMMD polymer (Tg: 131° C.) | 125° C. | Xylex | $2.7 \times 10^{-4}$ | ○ | ○ | x | x | x | Less than 5 mm | 98.9 |
| Example 3 | PFMMD polymer (Tg: 131° C.) | 116° C. | Xylex | $3.0 \times 10^{-4}$ | ○ | ○ | ○ | ○ | ○ | Less than 1 mm | 96.2 |
| Example 4 | PFMMD polymer (Tg: 131° C.) | 107° C. | Xylex | $2.2 \times 10^{-4}$ | ○ | ○ | ○ | ○ | ○ | Less than 1 mm | 96.8 |
| Comparative Example1 | PBVE polymer (Tg: 108° C.) | Unknown | Xylex | $2.0 \times 10^{-4}$ | ○ | ○ | ○ | ○ | x | Less than 2 mm | 94.4 |
| Comparative Example 2 | PFMMD polymer (Tg: 131° C.) | 125° C. | Xylex | $0.5 \times 10^{-4}$ | ○ | x | x | x | x | More than 5 mm | 99.4 |
| Comparative Example 3 | PFMMD polymer (Tg: 131° C.) | 110° C. | Xylex | $1.9 \times 10^{-4}$ | ○ | x | x | x | x | More than 5 mm | 98.8 |
| Comparative Example4 | PFMMD polymer (Tg: 131° C.) | 110° C. | DURABIO | $1.8 \times 10^{-4}$ | ○ | x | x | x | x | More than 5 mm | 99.2 |
| Comparative Example5 | PFMMD polymer (Tg: 131° C.) | 110° C. | DURABIO | $0.6 \times 10^{-4}$ | ○ | x | x | x | x | More than 5 mm | 99.4 |

The POFs of Examples 1 to 4 ensure such a flexibility that a minimum curvature radius of less than 5 mm can be achieved and achieve a dimensional stability of 95% or more after the exposure to 105° C. for a long time. For each of the POFs of Examples 1 and 2, the birefringence of the fiber structure composed of the core and the clad is $2.2\times10^{-4}$ or more, which indicates that the resins are highly oriented in the fiber axial direction. It is thought that because of such a configuration, each of the POFs of Examples 1 to 4 can ensure a favorable flexibility and have an improved heat resistance. As to the POF of Comparative Example 1, the flexibility is excellent; however, since the resin used for the core and the clad has a glass transition temperature of less than 120° C., the dimension retention rate is less than 95% after the exposure to 105° C. for a long time. That is, improvement in heat resistance failed. The POFs of Comparative Examples 2 to 5 were able to achieve an excellent heat resistance since the resin used for the core and the clad is the same as the resin used in Examples 1 and 2; however, the POFs of Comparative Examples 2 to 5 were unable to ensure a minimum curvature radius of 5 mm or less.

INDUSTRIAL APPLICABILITY

The POF of the present invention is suitable for use in applications where the POF is required to have heat resistance and flexibility.

The invention claimed is:

1. A plastic optical fiber comprising:
a core; and
a clad disposed on an outer circumference of the core, wherein
the core includes a first resin,
the clad includes a second resin,
the first resin has a first glass transition temperature $Tg_1$ of 120° C. or higher,
the second resin has a second glass transition temperature $Tg_2$ of 120° C. or higher,
when the plastic optical fiber bent once 180 degrees at 25° C. has a curvature radius R and a minimum of the curvature radius R is defined as a curvature radius at which a crack does not occur in a bent portion of the plastic optical fiber, the minimum is less than 5 mm, and
a fiber structure composed of the core and the clad has a birefringence of $2.0\times10^{-4}$ or more.

2. A plastic optical fiber comprising:
a core; and
a clad disposed on an outer circumference of the core, wherein
the core includes a first resin,
the clad includes a second resin,
the first resin has a first glass transition temperature $Tg_1$ of 120° C. or higher,
the second resin has a second glass transition temperature $Tg_2$ of 120° C. or higher, and
a fiber structure composed of the core and the clad has a birefringence of $2.0\times10^{-4}$ or more.

3. The plastic optical fiber according to claim 1, wherein at least one selected from the group consisting of the first resin and the second resin is a fluorine-containing resin.

4. The plastic optical fiber according to claim 3, wherein the fluorine-containing resin includes a fluorine-containing polymer including a structural unit (A) represented by the following formula (1):

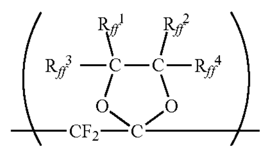

(1)

where $R_{ff}^1$ to $R_{ff}^4$ each independently represent a fluorine atom, a perfluoroalkyl group having 1 to 7 carbon atoms, or a perfluoroalkyl ether group having 1 to 7 carbon atoms, and $R_{ff}^1$ and $R_{ff}^2$ are optionally linked to form a ring.

5. The plastic optical fiber according to claim 4, wherein the fluorine-containing polymer further includes a structural unit (B) represented by the following formula (2):

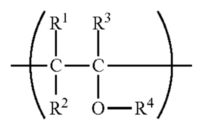

(2)

where $R^1$ to $R^3$ each independently represent a fluorine atom or a perfluoroalkyl group having 1 to 7 carbon atoms, $R^4$ represents a perfluoroalkyl group having 1 to 7 carbon atoms, the perfluoroalkyl group optionally has a ring structure, one or some of the fluorine atoms are each optionally substituted by a halogen atom other than a fluorine atom, and one or some of fluorine atoms in the perfluoroalkyl group are each optionally substituted by a halogen atom other than a fluorine atom.

6. The plastic optical fiber according to claim 4, wherein the fluorine-containing polymer further includes a structural unit (C) represented by the following formula (3):

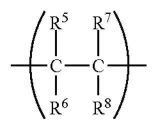

(3)

where $R^5$ to $R^8$ each independently represent a fluorine atom or a perfluoroalkyl group having 1 to 7 carbon atoms, the perfluoroalkyl group optionally has a ring structure, one or some of the fluorine atoms are each optionally substituted by a halogen atom other than a fluorine atom, and one or some of fluorine atoms in the perfluoroalkyl group are each optionally substituted by a halogen atom other than a fluorine atom.

7. The plastic optical fiber according to claim 4, wherein the fluorine-containing polymer further includes a structural unit (D) represented by the following formula (4):

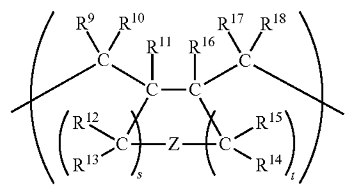

(4)

where Z represents an oxygen atom, a single bond, or —OC($R^{19}R^{20}$)O—, $R^9$ to $R^{20}$ each independently represent a fluorine atom, a perfluoroalkyl group having 1 to 5 carbon atoms, or a perfluoroalkoxy group having 1 to 5 carbon atoms, one or some of the fluorine atoms are each optionally substituted by a halogen atom other than a fluorine atom, one or some of fluorine atoms in the perfluoroalkyl group are each optionally substituted by a halogen atom other than a fluorine atom, one or some of fluorine atoms in the perfluoroalkoxy group are optionally substituted by a halogen atom other than a fluorine atom, s and t are each independently 0 to 5, and s+t is an integer of 1 to 6 or, in the case where Z is —OC($R^{19}R^{20}$)O—, s+t is optionally 0.

8. The plastic optical fiber according to claim 1, further comprising a reinforcing layer disposed on an outer circumference of the clad.

9. The plastic optical fiber according to claim 8, wherein a dimension retention rate of the plastic optical fiber after exposure to 105° C. for 250 hours is 95% or more, where the dimension retention rate is a ratio of a length of the plastic optical fiber after the exposure to 105° C. for 250 hours to a length of the plastic optical fiber before the exposure to 105° C. for 250 hours.

10. The plastic optical fiber according to claim 1, wherein a material of the core has a glass transition temperature of 105° C. or higher.

11. A hybrid cable comprising the plastic optical fiber according to claim 1.

12. A patch cord comprising:

a cable including the plastic optical fiber according to claim 1; and a connector attached to at least one end portion of the cable.

13. An active optical cable comprising:

a cable including the plastic optical fiber according to claim 1;

a first connector attached to a first end portion of the cable and including a first converter that converts an electrical signal into an optical signal; and a second connector attached to a second end portion of the cable and including a second converter that converts an optical signal into an electrical signal.

* * * * *